United States Patent Office 3,262,472
Patented July 26, 1966

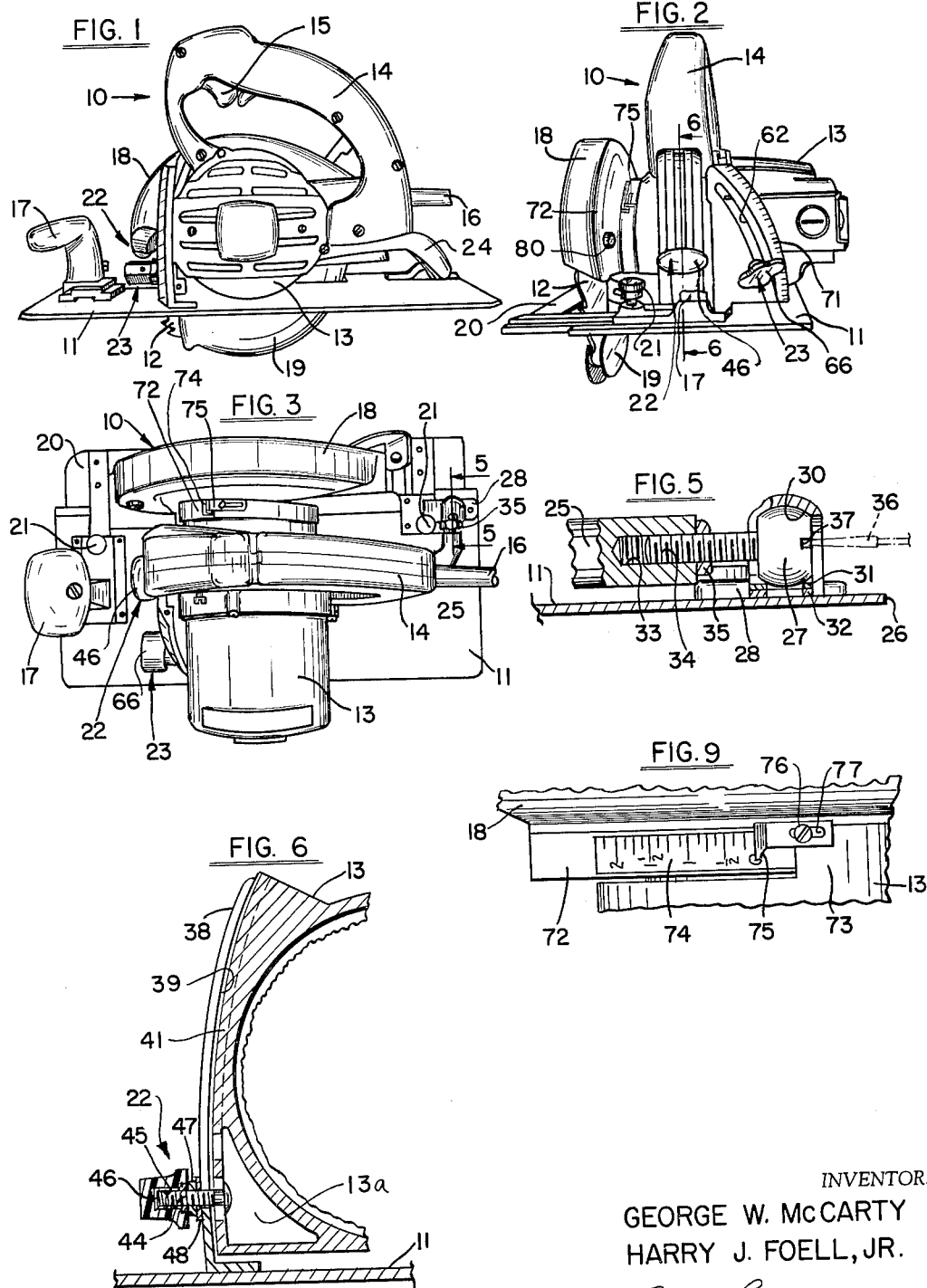

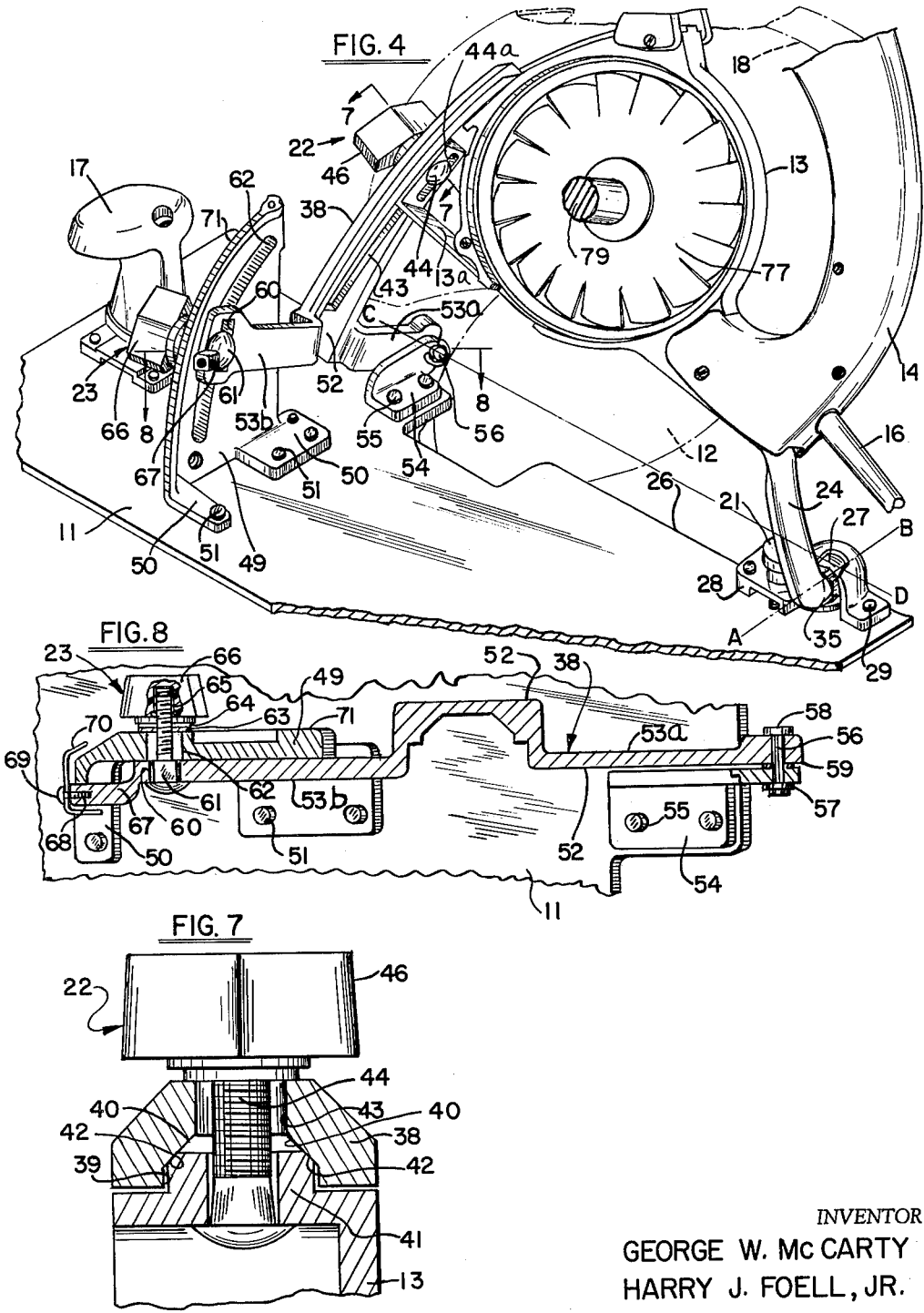

3,262,472
DEPTH AND BEVEL ADJUSTMENT MEANS FOR PORTABLE POWER-DRIVEN SAW
George W. McCarty, Towson, and Harry J. Foell, Jr., Lutherville, Md., assignors to The Black and Decker Manufacturing Company, Towson, Md., a corporation of Maryland
Filed May 8, 1964, Ser. No. 366,070
6 Claims. (Cl. 143—43)

The present invention relates to a depth and bevel adjustment means for a portable power-driven saw, and more particularly, to an improved means for facilitating an easy and accurate adjustment in the depth of cut and the bevel of cut, respectively, of a portable electric saw.

It is an object of the present invention to provide an improved depth and bevel adjustment means for a portable electric saw and the like, whereby a quick and easy adjustment may be made, as for example, with the operator holding the saw in midair with one hand and making the various adjustments with his other hand.

It is another object of the present invention to insure that the operator's line-of-cut and blade visibility will not be obscured or imparied by the improved depth and bevel adjustment means of the present invention.

It is yet another object of the present invention to provide a "three point" means for securing the housing structure to the planar shoe plate.

It is a further object of the present invention to provide an improved depth and bevel adjustment means utilizing a rugged and reliable structure, one which will hold up well under severe operating conditions.

The present invention finds particular utility in conjunction with a portable power-driven saw of the type having a shoe plate, a blade extending beyond the shoe plate, and a housing on the shoe plate with a motor to drive the blade, and preferably, to a saw unit having a generally-cylindrical motor housing extending transversely of the shoe plate.

In accordance with the broad teachings of the present invention, there is herein illustrated and described an improved depth and bevel adjustment means for the blade with respect to the shoe plate; and this improved means includes a means to pivotably mount the housing to one end of the shoe plate for movement about two mutually-perpendicular axes, one of which is substantially parallel to the blade axis, and the other of which is substantially perpendicular to the blade axis, thereby facilitating an adjustment in the depth of cut and the bevel of cut, respectively. An arcuately-formed depth control member is positioned on the side of the housing which is opposite from the last-named pivotable mounting means; and means are provided to adjustably secure the depth control member to the housing at selected raised positions of the housing with respect to the shoe plate, thereby regulating the depth of cut. A bevel control member is mounted on the shoe plate adjacent to the depth control member, and means are provided to adjustably secure the bevel control member to the depth control member at selected tilted positions of the housing with respect to the shoe plate, thereby regulating the bevel of cut.

Preferably, the depth control member comprises an arcuate channel that closely conforms to the generally-cylindrical motor housing and is positioned in close to the housing, while the bevel control member comprises a bevel quadrant that is positioned laterally of the arcuate channel and in a direction away from the saw blade, such that the operator's visibility of the line of cut and of the blade is not impaired, a deficiency found invariably in the prior art structures.

In accordance with the specific teachings of the present invention, the improved depth and bevel adjustment means includes a means to pivotably mount the housing to the rear end of the shoe plate for movement about two mutually-perpendicular axes, the first of which is substantially parallel to the blade axis, and the second of which is substantially perpendicular to the blade axis, thereby facilitating an adjustment in the depth of cut and the bevel of cut, respectively. An arcuately-formed depth control member, comprising an arcuate channel closely conforming to the cylindrical housing and having an arcuate slot formed on a radius from the first axis of the pivotable mounting means, is positioned in close to the front of the housing opposite from the pivotable mounting means; and means are provided to adjustably secure the arcuate channel to the housing at selected raised positions of the housing with respect to the shoe plate, thereby regulating the depth of cut. A bevel control member, comprising a bevel quadrant having an arcuate slot formed on a radius from the second axis of the pivotable mounting means, is secured on the shoe plate laterally of the depth control member and in a direction away from the blade. The channel-formed depth control member includes a base porion which has a pair of laterally-extending ears, one on each side of the member. Means are provided to pivotably mount one of the ears to the shoe plate for movement about the second axis, and means are further provided to adjustably secure the other of said ears to the bevel quadrant at selected tilted positions of the housing with respect to the shoe plate.

In the preferred embodiment, the means to pivotably mount the housing to the rear end of the shoe plate (for movement about the two mutually-perpendicular axes) includes an arm member which is carried by the housing and projects rearwardly therefrom in a direction substantially transverse to the axis of blade rotation. The arm member has a right-angularly bent portion which extends substantially parallel to the blade axis and in a direction towards a side edge of the shoe plate. A spherically-formed bearing knuckle is provided on the end of this bent portion of the arm member, and a bearing retainer is mounted on the shoe plate and is provided with a spherical seat to journal the knuckle.

In the preferred embodiment, the arcuately-formed depth control member comprises an arcuate channel having a longitudinal keyway formed with a pair of inwardly-directed longitudinal beveled surfaces, one on each side of the keyway. The housing, on the other hand, is provided with an arcuate key which is received in the keyway, and this key has a pair of longitudinal beveled surfaces mating with the respective beveled surfaces of the keyway, whereby a wedging action is obtained tending to maintain the channel against the housing.

These and other objects of the present invention will become apparent from a reading of the following specification, taken in conjunction with the enclosed drawings, in which:

FIGURE 1 is a side elevation of a portable power-driven saw as viewed from the rear of its generally-cylindrical motor housing;

FIGURE 2 is a front elevation of the saw unit illustrated in FIGURE 1, with the front knob being broken away to illustrate the adjustable knob of the depth control means;

FIGURE 3 is a top plan view of the overall saw unit;

FIGURE 4 is a fragmentary perspective view of the shoe plate and of the means to mount the motor housing to the shoe plate to facilitate a regulation in the depth and bevel of cut, the view being taken looking into the rear portion of the shoe plate, and the motor housing being broken away to illustrate the preferred embodiment of the improved depth and bevel adjustment means of the present invention;

FIGURE 5 is a detail section view taken along the lines 5—5 of FIGURE 3, showing the means to pivotally mount the motor housing to the rear end of the shoe plate for movement about two mutually-perpendicular axes, and further showing an optional means to aline the blade with the longitudinal side edge of the shoe plate;

FIGURE 6 is a section view taken along the line 6—6 of FIGURE 2, showing the arcuately-formed channel-shaped depth control member and the method of securing it (adjustably) to the front of the generally-cylindrical motor housing;

FIGURE 7 is a section view taken along the lines 7—7 of FIGURE 4, enlarged over the scale of FIGURE 4, and showing the wedging action which is obtained between the longitudinal keyway in the arcuate channel member and the key formed on the front of the generally-cylindrical motor housing;

FIGURE 8 is a section view taken along the lines 8—8 of FIGURE 4, showing the means to pivotally mount one ear of the base portion of the arcuately-formed channel member to the shoe plate, and also, the means to adjustably secure the other ear to the quadrant-shaped bevel control member; and FIGURE 9 is a top plan view of a portion of FIGURE 3, showing the depth calibration scale preferably located on the top of the unit between the control handle and the upper guard, such that it is readily visible to the operator looking down on the unit in his normal position of using and handling the saw.

With reference to FIGURES 1–3, there is illustrated a portable electric saw 10 with which the teachings of the present invention may find particular utility; however, it will be appreciated by those skilled in the art that the teachings of the invention are equally applicable to other types of portable power-driven rotary tools other than the particular saw 10.

With this in mind, the overall saw 10 comprises a substantially-flat shoe plate 11 by means of which the unit is supported on top of a workpiece, a blade 12 extending through the shoe plate to engage the work, a generally-cylindrical housing 13 on the shoe plate with a motor (not shown) to drive the blade, an upper control handle 14 mounted on the housing, the handle being provided with a trigger switch 15 for energizing the unit from an electric line cord 16, a front knob 17 to assist in handling the unit in making a cut, an upper guard 18 laterally of the handle, a pivoted lower guard 19 adapted to telescope within the upper guard in making a cut, a removable outboard auxiliary shoe plate 20 mounted on the shoe plate 11 by means of clamp screws 21, a depth adjustment means, generally denoted as at 22, for raising or lowering the blade with respect to the shoe plate for selective depths of cut, and a bevel adjustment means, generally denoted as at 23, for selectively tilting the blade to facilitate a bevel cut.

The present invention relates more particularly to the improved depth and bevel adjustment means for the saw unit, and this improved means may be understood more readily with reference to FIGURES 4–8. The motor housing 13 carries an arm member 24 which projects rearwardly therefrom in a direction substantially transverse to the axis of blade rotation, and this arm member 24 has a right-angularly bent portion 25, see FIGURE 3, which extends substantially parallel to the blade axis and in a direction towards the side edge 26 of the shoe plate. A spherically-formed bearing knuckle 27, see FIGURE 5, is carried on the end of the bent portion 25 of the arm member 24. A bearing retainer 28 is mounted on the shoe plate by rivets 29 or other suitable means, and this retainer is formed as a bearing bracket having a partially-completed spherical seat 30 to journal the spherical knuckle 27. The knuckle 27 is constantly urged against its spherical seat 30 by means of a spring washer 31 and washer 32 retained between the knuckle and the shoe plate.

In such a manner, the motor housing is pivotably mounted to the rear end of the shoe plate for movement about two mutually-perpendicular axes, one of which, denoted as AB in FIGURE 4, is substantially parallel to the blade axis and facilitates an adjustment in the depth of cut, and the other of which, CD, is substantially perpendicular to the blade axis and facilitates an adjustment in the bevel of cut.

Preferably, but not necessarily, the bent portion 25 of the arm member 24 is provided with a tapped longitudinal bore 33, see FIGURE 5, while the bearing knuckle 27 has a threaded extension 34 engaged in the tapped bore and retained therein by means of a lock nut 35. When the lock nut 35 is loosened, a screwdriver blade 36, shown in phantom in FIGURE 5, may be inserted within a kerf 37 formed in the bearing knuckle 27, so as to cause the housing structure to deflect or yield slightly about its securing means to the shoe plate, thereby bringing the plane of the saw blade into alinement with the longitudinal side edge 26 of the shoe plate. This blade alinement means, which forms no part of the present invention, is described in detail in the co-pending McCarty et al. application Ser. No. 366,021 filed May 8, 1964, entitled "Shoe Plate Alining Means for Portable Power-Driven Saw," and assigned to the assignee of the present invention.

With particular reference to FIGURES 4, 6, and 7, an arcuately-formed depth control member, comprising an arcuate channel 38, is positioned in close to the front of the generally-cylindrical motor housing and closely conforms to the shape of the housing, so as not to interfere with the operator's visibility of the line of cut and of the saw blade. This arcuate channel 38 is provided with a longitudinal keyway 39, see FIGURE 7, having a pair of inwardly-directed longitudinal beveled surfaces 40, one on each side of the keyway. The housing 13 is provided with a complementary arcuate key 41, see FIGURE 6, which is received in the keyway 39; and this arcuate key 41 is provided with a pair of longitudinal complementary beveled surfaces 42, which mate with the respective beveled surfaces 40 of the keyway 39, thereby creating a wedging action which tends to maintain the key in its keyway. Preferably, the key 41 engages the keyway 39 along the complementary beveled surfaces 40, 42, see FIGURE 7, with a longitudinal and a lateral clearance (forming no part of the present invention) being provided for between the arcuate channel 38 and the housing. A slot 43 is formed in the arcuate channel 38 intermediate the beveled surfaces 40, and this slot 43 is arcuately formed on a radius from the axis AB. A headed screw 44 is retained in a wedge-shaped extension 13a of the housing 13, below the arcuate key 41, and the screw 44 passes through a slot 44a in the housing extension and through the arcuate slot 43 and is secured to a tapped insert sleeve formed integrally with an adjusting knob 46. Preferably, the adjusting knob 46 is molded from a suitable plastic, and a washer 47 and spring washer 48 are interposed between the channel and the knob. When the adjusting knob 46 is loosened, the entire housing structure 13 may be raised (or lowered) about its pivot axis AB, see FIGURE 4, and thereafter the adjusting knob 46 may be tightened to secure the arcuate channel 38 to the housing at the selected raised position of the housing with respect to the shoe plate.

A bevel control member, comprising a bevel quadrant 49, is positioned on the shoe plate laterally of the arcuate channel 38 and in a direction away from the blade. The bevel quadrant 49 has a base portion 50 which is secured to the shoe plate by means of rivets 51 or other suitable means. The arcuate channel 38 has a base portion 52 which is provided with a pair of laterally-extending ears 53a and 53b, one on each side of the arcuate channel 38. A bracket 54 is secured to the shoe plate by means of rivets 55 or other suitable means; and a pivot pin 56, see FIGURE 8, is retained in the bracket by means of a snap ring 57. The pivot pin is headed, as at 58, and is received through the end of the one ear 53a of the arcuate channel 38, a spring washer 59 being interposed between the respective ear 53a and the bracket 54. In such a manner, the respective ear 53a is pivotably mounted to the shoe plate for movement about the axis CD.

The other ear 53b of the base portion of the arcuate channel member 38 is provided with a slot 60, and a headed screw 61 is received through the slot and through an arcuate slot 62 formed in the bevel quadrant 49. This arcuate slot 62 is formed on a radius from the axis CD. The screw 61 is secured to a tapped insert sleeve 65 formed integrally within an adjusting knob 66. Preferably, the adjusting knob 66 is molded from a suitable plastic, and a washer 63 and spring washer 64, see FIGURE 8, are interposed between the knob and the bevel quadrant 49. In such a manner, the knob 66 may be loosened, and thereafter the entire housing structure 13 may be tilted about the axis CD, thereby facilitating an adjustment in the bevel of cut of the saw blade.

Moreover, the end of the respective ear 53b has a prismatic boss 67 provided with a tapped bore 68, which receives a screw 69 to mount an indicator pointer 70. The pointer 70 cooperates with a graduated scale 71, see FIGURES 2 and 8, formed intergrally on the bevel quadrant 49, thereby indicating the particular angular relationship of the saw blade with respect to the shoe plate. In FIGURE 4, however, the pointer 70 has been omitted for ease of illustration; also, in FIGURE 4, the motor housing 13 has been broken away, showing only the conventional fan 78 and motor shaft 79, the latter being connected to drive the saw blade 13 in a suitable manner understood by those skilled in the art.

In a preferred embodiment, the upper guard 18 is rotatably mounted on the motor housing 13 in a suitable member; and preferably a positioning linkage (not shown) is disposed between the guard and the shoe plate, so that as the motor housing 13 is raised or lowered for selective depths of cut of the saw blade, the upper guard 18 will pivot or rotate through a slight angle, thereby maintaining the front portion of the saw blade substantially covered at all times. Preferably, see FIGURE 9, the upper guard 18 is formed with an integral arcuate flange 72, while the motor housing is formed with a corresponding flange 73 adapted to telescope over the flange 72 on the upper guard. A graduated scale 74 is mounted on top of the flange 72, while an indicating pointer 75 is mounted on the corresponding flange 73 on the housing, thereby indicating directly the particular depth of cut of the saw blade. The scale 74 and its indicating pointer 75 are readily visible to the operator, looking down on the saw, in his normal position of handling and using the unit. Moreover, the pointer 75 is adjustably mounted by means of the screw 76 and slot 77, such that the required accuracy may be maintained even though the saw blade is sharpened to a reduced diameter. The structure and function of the depth calibration means form no part of the present invention, but may be referred to in detail in the co-pending McCarty application Ser. No. 366,022, filed May 8, 1964, entitled "Depth Calibration Means for Portable Power-Driven Saw," and assigned to the assignee of the present invention. Also, the particular positioning linkage between the rotatably mounted upper guard and the shoe plate, which has a pivot point 80 shown in FIGURE 2, forms no part of the present invention, but may be referred to in detail in the co-pending Elson application Ser. No. 366,343, filed May 11, 1964, entitled "Positioning Linkage for Rotatably Mounted Upper Guard of Portable Power-Driven Saw," and assigned to the assignee of the present invention.

In summary, the present invention facilitates a quick, easy, and accurate adjustment in the depth of cut and the bevel of cut, respectively, of the saw blade. The arcuate formation of the depth control member 38, its closed conformity with the generally-cylindrical transversely-disposed motor housing 13, and its adjustable mounting to the front of the housing—together with the bevel quadrant 49 being secured to the shoe plate 11 laterally of the arcuate channel 38 and in a direction away from the saw blade 12—insures that the operator's visibility of the blade and of the line of cut will not be obscured or impared. The depth and bevel adjustments are facilitated by means of the spherically-formed bearing knuckle 27, which is retained on the rear of the shoe plate 11 for pivotably mounting the housing structure 13 about the mutually-perpendicular axes AB and CD. The wedging action obtained between the keyway in the arcuate channel and the complementary key in the housing, in combination with the pivotable mounting of the motor housing to the rear of the shoe plate, allows the depth of cut to be adjusted even while the operator is holding the unit in midair with one hand and making the adjustment with his other hand. This is simply not possible with the commercial prior art units, which invariably require the unit to be supported upon a table or workpiece prior to an adjustment in the depth of cut. The improved means of the present invention, however, obviates this requirement entirely and hence allows the operator to adjust the depth of cut even though he is on a scaffold or ladder out in the field. The structure of the present invention combines ruggedness and reliability with ease of adjustment, yet is compatible with a high degree of accuracy and precision. Moreover, the housing structure is secured to the shoe plate at three places, namely, at the bearing retainer 23 for the sperical knuckle 17, at the bracket 54 for the pivot pin 56 on the ear 53a, and at the bevel quadrant base portion 50, thereby providing a "three point" securing means between the housing structure and the shoe plate.

Obviously, many modifications may be made without departing from the basic spirit of the present invention; and accordingly, within the scope of the appended claims, the invention may be practiced other than has been specifically described herein.

We claim:

1. In a portable power-driven saw of the type having a shoe plate, a blade extending beyond the shoe plate, and a housing structure extending transversely of the shoe plate with a motor connected to drive the blade; a depth and bevel adjustment means for the blade with respect to the shoe plate, comprising, in combination:

(a) means to pivotably mount the housing to the rear end of the shoe plate for movement about two axes, the first of which is substantially parallel to the blade axis, and the second of which is substantially perpendicular to the blade axis, thereby facilitating an adjustment in the depth of cut and the bevel of cut, respectively;

(b) an arcuate depth control member formed on a radius from the first axis and positioned in relation to the front of the housing opposite from said last-named means;

(c) means to adjustably secure said depth control member to the housing at selected raised positions of the housing with respect to the shoe plate;

(d) a bevel control member secured on the shoe plate and including a portion thereof disposed laterally of said depth control member in a direction away from the blade; said bevel control member portion being formed on a radius from the second axis;

(e) said depth control member including a base portion having a respective pair of ears extending laterally therefrom, one in a direction towards the blade, and the other in a direction away from the blade;

(f) means to pivotally mount the end of said one ear in relation to the shoe plate for movement about said second axis; and (g) means to adjustably secure the end of said other ear to said bevel control member portion at selected tilted positions of the housing with respect to the shoe plate; whereby the housing has a "three point"

connection with respect to the shoe plate for greater rigidity at selected articulated positions of the depth and bevel adjustment means.

2. The combination of claim 1 wherein said means to pivotably mount the housing to the rear end of the shoe plate for movement about said two axes, comprises:
   (a) an arm member carried by the housing and projecting rearwardly therefrom substantially transverse to the axis of blade rotation;
   (b) said arm member having a right-angularly bent portion extending substantially parallel to the blade axis and in a direction towards a side edge of the shoe plate;
   (c) a spherically-formed bearing knuckle on the end of said bent portion of said arm member; and
   (d) a bearing retainer mounted on the shoe plate and having a spherical seat to journal said knuckle.

3. The combination of claim 1, wherein:
   (a) said arcuately-formed depth control member comprises an arcuate channel having a longitudinal keyway formed with a pair of inwardly-directed longitudinal beveled surfaces, one on each side of said keyway; and wherein:
   (b) the housing is provided with an arcuate key received in said keyway;
   (c) said key having a pair of longitudinal beveled surfaces mating with said beveled surfaces of said keyway, whereby a wedging action is obtained tending to maintain said channel against the housing.

4. In a portable power-driven saw of the type having a shoe plate, a blade extending beyond the shoe plate, and a generally-cylindrical housing extending transversely of the shoe plate with a motor to drive the blade; a depth and bevel adjustment means for the blade with respect to the shoe plate, comprising, in combination:
   (a) an arm member carried by the housing and projecting rearwardly therefrom in a direction substantially transverse to the axis of blade rotation;
   (b) said arm member having a right-angularly bent portion extending substantially parallel to the blade axis in a direction towards the blade and the corresponding side edge of the shoe plate;
   (c) a spherically-formed bearing knuckle on the end of said bent portion of said arm member;
   (d) a bearing retainer mounted on the shoe plate and having a spherical seat to journal said knuckle, whereby the housing is pivotally mounted to the rear of the shoe plate for movement about two mutually-perpendicular axes, the first of which is substantially parallel to the blade axis, and the second of which is substantially perpendicular to the blade axis, thereby facilitating an adjustment in the depth of cut and the bevel of cut, respectively;
   (e) an arcuately-formed depth control member closely conforming to the housing and positioned on the front of the housing opposite from said arm member;
   (f) said arcuately-formed depth control member comprising an arcuate channel having a longitudinal keyway formed with a pair of inwardly-directed longitudinal beveled surfaces, one on each side of said keyway;
   (g) the housing having an arcuate key received in said keyway;
   (h) said key having a pair of longitudinal beveled surfaces mating with said beveled surfaces of said keyway, thereby creating a wedging action tending to maintain said key in said keyway;
   (i) means including a slot formed in said arcuate channel intermediate said respective beveled surfaces and a screw carried by the housing below said key in the housing, said screw passing through said slot, to adjustably secure said arcuate channel to the housing at selected raised positions of the housing with respect to the shoe plate;
   (j) a bevel control member comprising a bevel quadrant secured on the shoe plate laterally of said arcuate channel and in a direction away from the blade;
   (k) said arcuate channel having a base portion formed with a pair of laterally-extending ears, one on each side of said channel;
   (l) means to pivotably mount one of said ears to the shoe plate for movement about said second axis; and
   (m) means to adjustably secure the other of said ears to said bevel quadrant at selected tilted positions of the housing with respect to the shoe plate.

5. The combination of claim 4, wherein said means to pivotably connect one of said ears to the shoe plate, comprises:
   (a) a bracket secured to the shoe plate;
   (b) a pivot pin retained in said bracket; and
   (c) means mounting the end of said respective ear to said pivot pin.

6. In a portable power-driven saw of the type having a shoe plate, a blade extending beyond the shoe plate, and a housing on the shoe plate with a motor connected to drive the blade; a depth and bevel adjustment means for the blade with respect to the shoe plate, comprising, in combination:
   (a) means to pivotably mount the housing to one end of the shoe plate for movement about two mutually-perpendicular axes, the first of which is substantially parallel to the blade axis, and the second of which is substantially perpendicular to the blade axis, thereby facilitating an adjustment in the depth of cut and the bevel of cut, respectively;
   (b) a depth control member positioned on the side of the housing which is opposite from said pivotable mounting means;
   (c) said depth control member having an arcuate slot formed on a radius from said first axis of said pivotable mounting means;
   (d) means including a fastening member passing through said arcuate slot to adjustably secure said depth control member to the housing at selected raised positions of the housing with respect to the shoe plate;
   (e) a bevel quadrant secured on the shoe plate laterally of said depth control member and in a direction away from the blade;
   (f) said bevel quadrant having an arcuate slot formed on a radius from said second axis of said pivotable mounting means;
   (g) said depth control member having a base portion;
   (h) means to pivotably mount one end of said base portion to the shoe plate for movement about said second axis; and
   (i) means including a fastening member passing through said arcuate slot of said bevel quadrant to adjustably secure the other end of said base portion of said depth control member to said bevel quadrant at selected tilted positions of the housing with respect to the shoe plate.

References Cited by the Examiner
UNITED STATES PATENTS

| 2,761,474 | 9/1956 | Dolan | 143—43 |
| 2,765,824 | 10/1956 | Hartmann et al. | 143—43 X |
| 2,767,747 | 10/1956 | Burrows | 143—43 X |
| 2,963,056 | 12/1960 | Rickford | 143—43 X |

WILLIAM W. DYER, JR., *Primary Examiner.*

W. D. BRAY, *Assistant Examiner.*